Sept. 6, 1938.　　　H. M. BARBER　　　2,128,981
SHEET HANDLING MECHANISM FOR WEB PRINTING ROTARY PRESSES
Filed April 30, 1936
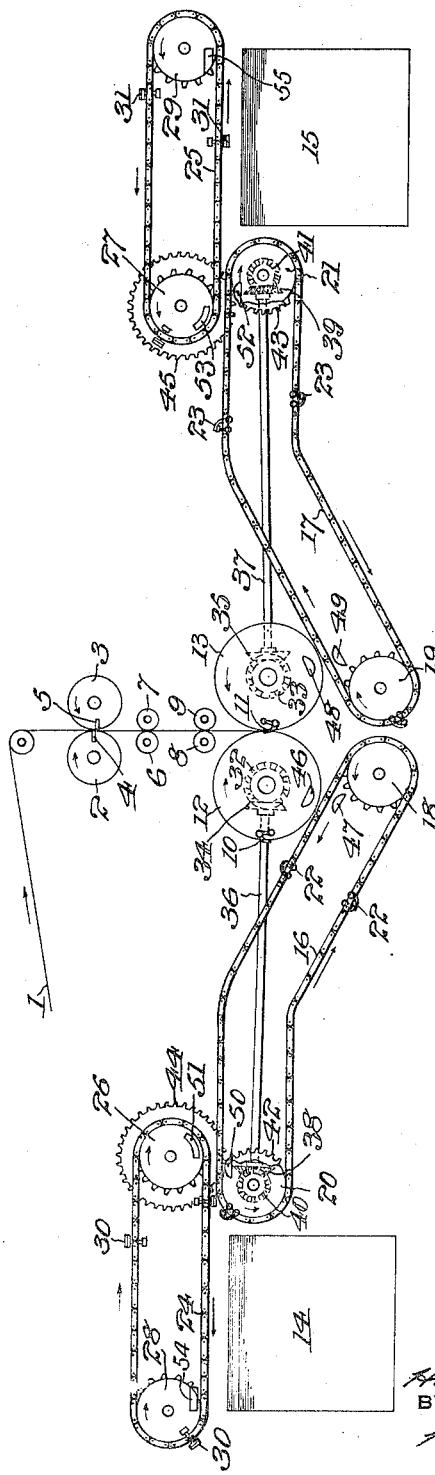
INVENTOR
Howard M. Barber
BY
ATTORNEYS Patented Sept. 6, 1938

2,128,981

UNITED STATES PATENT OFFICE 2,128,981

SHEET HANDLING MECHANISM FOR WEB PRINTING ROTARY PRESSES

Howard M. Barber, Pawcatuck, Conn., assignor to C. B. Cottrell & Sons Company, Westerly, R. I., a corporation of Delaware Application April 30, 1936, Serial No. 77,139

2 Claims. (Cl. 271—64)

The object of my invention is to sever sheets from a traveling web and forward the sheets in opposite directions for delivery flat upon front and rear piles, the delivery mechanism operating to reduce the speed of travel of the sheets before they are delivered.

My invention comprises, generally, means for severing the sheets from the traveling web and means for transferring the sheets to oppositely disposed sheet transfer endless carriers, which carriers in turn transfer the sheets to their sheet delivery endless carriers.

My invention more particularly comprises coacting cutters for severing the sheets from the traveling web, coacting sheet transfer rotary carriers, oppositely directed sheet transfer endless carriers and their respective sheet delivery endless carriers.

A practical embodiment of my invention is represented in the accompanying drawing, in which the figure illustrates in diagrammatic side elevation so much of a mechanism for cutting and delivering sheets as includes my invention.

The traveling web is denoted by 1. The rotary cutters 2, 3 are provided with coacting blades 4, 5 for severing the sheets from the traveling web. Rolls 6, 7 and 8, 9 serve to guide the web into position to cause the sheets cut from the web to be alternately taken by the grippers 10, 11 of the sheet transfer rotary carriers 12 and 13 respectively. The front and rear sheet delivery piles are denoted by 14 and 15 respectively.

The means which I have shown for forwarding the sheets from the sheet transfer rotary carriers 12 and 13 in opposite directions to be delivered flat upon the front and rear piles 14 and 15 is as follows:

The front and rear oppositely directed sheet transfer carriers 16 and 17 travel in endless paths, their inner ends being located beneath the sheet transfer rotary carriers 12 and 13 respectively. These sheet transfer endless carriers 16 and 17 comprise the usual side chains passing at their inner ends around the sprockets 18 and 19 and at their outer ends around the sprockets 20 and 21 respectively. These sheet transfer endless carriers are also provided with properly spaced sets of grippers 22 and 23 respectively.

The front and rear horizontally disposed sheet delivery carriers 24 and 25 travel in endless paths over their front and rear delivery piles 14 and 15, the inner ends of the sheet delivery endless carriers being located over the outer ends of the sheet transfer endless carriers. These sheet delivery endless carriers 24 and 25 comprise the usual side chains passing at their inner ends around the sprockets 26 and 27 and at their outer ends around the sprockets 28 and 29 respectively. These sheet delivery endless carriers 24 and 25 are provided with properly spaced sets of grippers 30 and 31 respectively.

The sheet transfer rotary carriers 12 and 13 and the sheet transfer endless carriers 16 and 17 are driven at substantially the same surface speed while the sheet delivery endless carriers are driven at a lesser surface speed. The means which I have shown for accomplishing this result is constructed, arranged and operated as follows:

Bevel gears 32 and 33 on the shafts of the sheet transfer rotary carriers mesh with bevel gears 34 and 35 at the inner ends of longitudinally disposed shafts 36 and 37, the outer ends of which shafts are provided with bevel gears 38 and 39 which mesh with bevel gears 40 and 41 on the shafts of the outer sprockets 20 and 21 of the sheet transfer endless carriers 16 and 17. Gears 42 and 43 on the shafts of the said outer sprockets 20 and 21 mesh with gears 44 and 45 on the shafts of the inner sprockets 26 and 27 of the sheet delivery endless carriers 24 and 25.

The grippers on the several rotary and endless carriers are operated to cause the grippers 10 and 11 on the sheet transfer rotary carriers 12 and 13 to take alternate sheets and deliver them to their coacting grippers 22 and 23 on the sheet transfer endless carriers 16 and 17. These grippers 22 and 23 are in turn operated to transfer the sheets to their coacting grippers 30 and 31 on the slower traveling sheet transfer endless carriers 24 and 25, which grippers 30 and 31 are released at the proper times to deposit the sheets upon the front and rear piles 14 and 15.

Coacting cams 46, 47 and 48, 49 serve to operate the grippers 10, 22 and 11, 23 to cause the transfer of the sheets from the sheet transfer rotary carriers 12 and 13 to the sheet transfer endless carriers 16 and 17. Coacting cams 50, 51 and 52, 53 serve to operate the grippers 22, 30 and 23, 31 to cause the transfer of the sheets from the sheet transfer endless carriers 16 and 17 to the sheet delivery endless carriers 24 and 25. Cams 54 and 55 serve to operate the grippers 30 and 31 to release the sheets and permit them to drop upon their respective front and back piles 14 and 15.

From the above description it will be seen that I have provided novel means whereby the sheets cut from a rapidly traveling web may be transferred to slower moving delivery carriers for deposit upon their respective delivery piles, thereby ensuring an efficient delivery of the sheets from a high speed web printing press.

It is evident that various changes may be resorted to in the construction, form and arrangement of the several parts without departing from the spirit and scope of my invention, and hence I do not intend to be limited to the particular embodiment herein shown and described.

What I claim is:

1. In a sheet delivery mechanism, front and rear delivery piles, two sheet delivery carriers traveling in endless elongated paths and provided with sheet grippers, two sheet transfer rotary carriers and two oppositely disposed sheet transfer carriers traveling in endless elongated paths and having grippers operable to take the sheets from their respective sheet transfer rotary carriers and transfer them to the grippers of their respective sheet delivery endless carriers while said sheet transfer endless carrier grippers are traveling in right lines between the ends of their sheet transfer endless carriers, the sheet transfer endless carriers extending from points beneath their sheet transfer rotary carriers to points beneath their sheet delivery endless carriers.

2. In a sheet delivery mechanism, front and rear delivery piles, two sheet delivery carriers traveling in endless elongated paths and provided with sheet grippers, two sheet transfer rotary carriers, two oppositely disposed sheet transfer carriers traveling in endless elongated paths and having grippers operable to take the sheets from their respective sheet transfer rotary carriers and transfer them to the grippers of their respective sheet delivery endless carriers while said sheet transfer endless carrier grippers are traveling in right lines between the ends of their sheet transfer endless carriers and means for driving the sheet transfer endless carriers at the surface speed of the sheet transfer rotary carriers and for driving the sheet delivery endless carriers at a lesser surface speed, the sheet transfer endless carriers extending from points beneath their sheet transfer rotary carriers to points beneath their sheet delivery endless carriers.

HOWARD M. BARBER.